(No Model.) 2 Sheets—Sheet 1.
R. R. BOWKER.
ELECTRICAL DISTRIBUTING SYSTEM.
No. 560,772. Patented May 26, 1896.
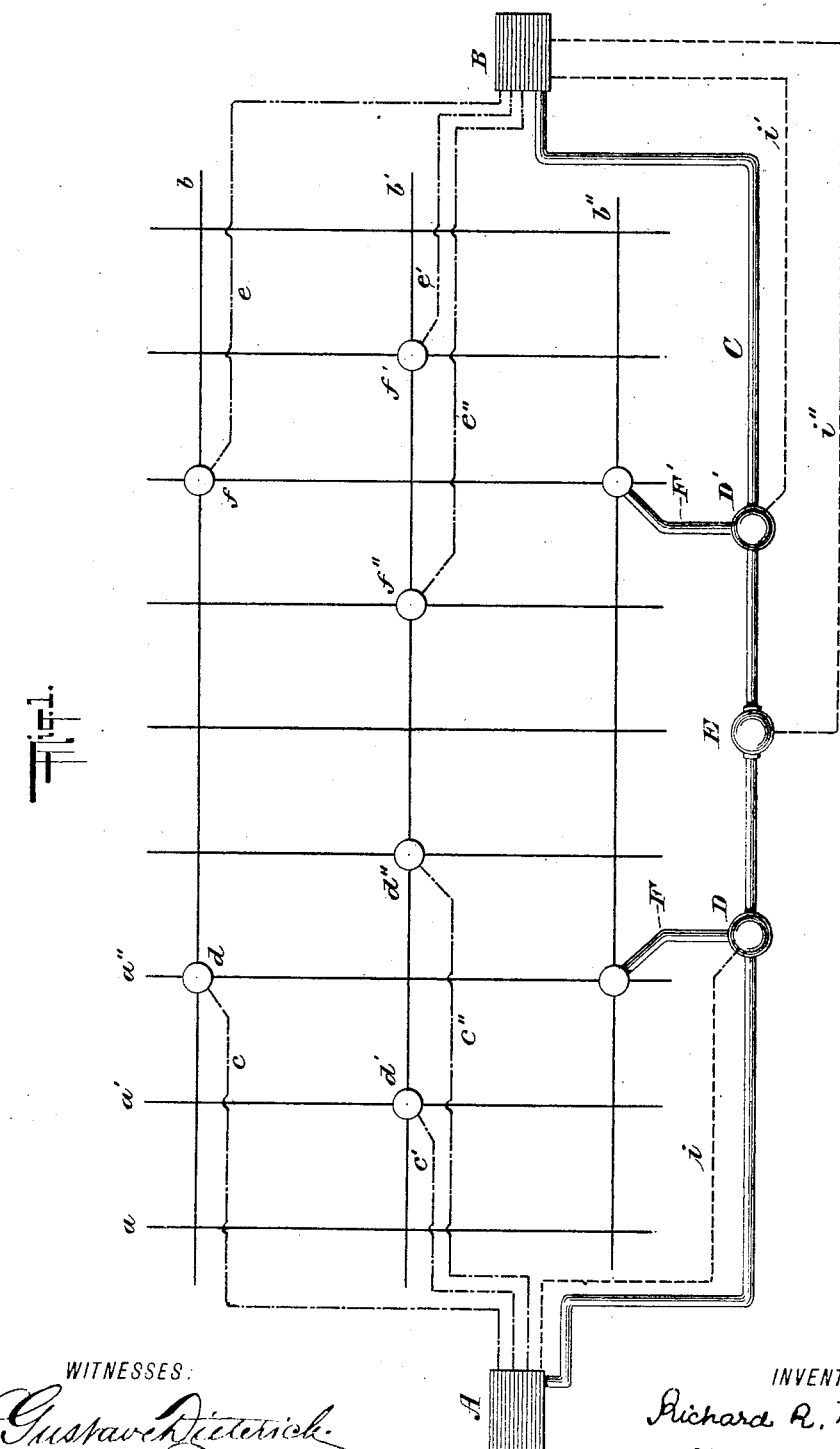
WITNESSES:
Gustave Dieterich.
John Kehlenbeck.
INVENTOR
Richard R. Bowker
BY Park Benjamin
his ATTORNEY.

(No Model.) 2 Sheets—Sheet 2.
R. R. BOWKER.
ELECTRICAL DISTRIBUTING SYSTEM.
No. 560,772. Patented May 26, 1896.
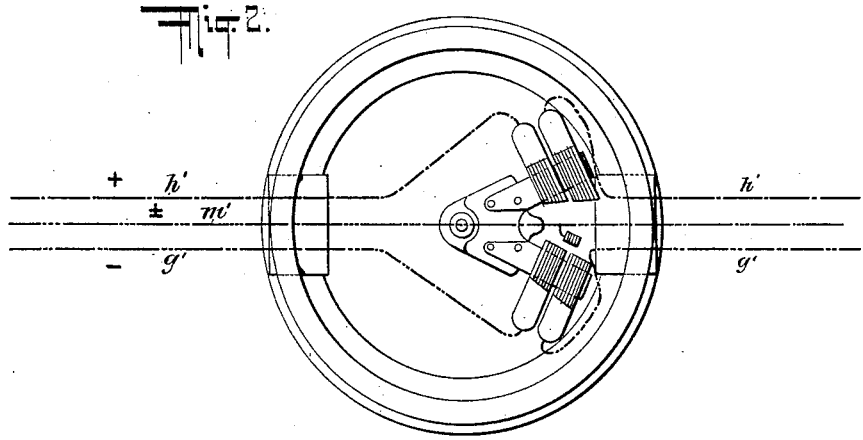
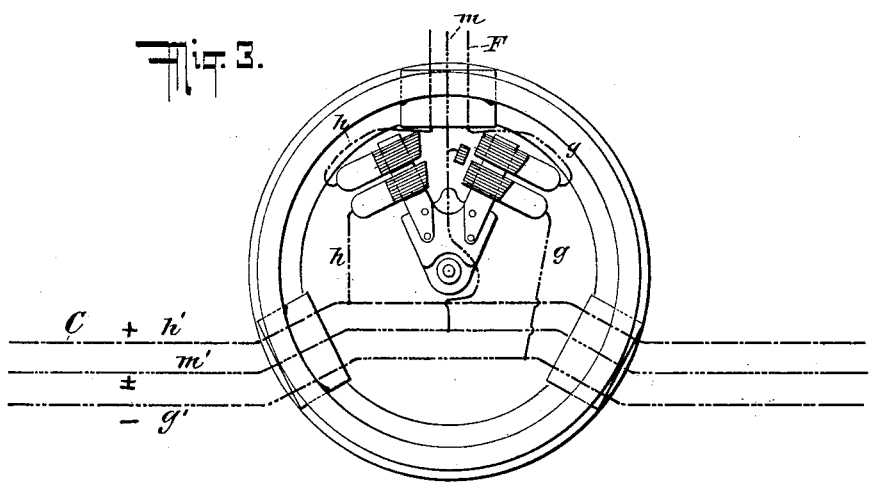
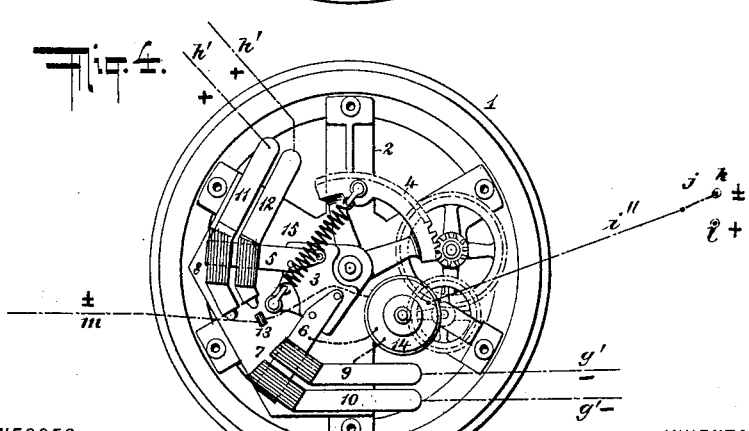
WITNESSES:
Gustave Dieterich.
John Kehlenbeck.
INVENTOR
Richard R. Bowker
BY Park Benjamin
HIS ATTORNEY

UNITED STATES PATENT OFFICE.

RICHARD R. BOWKER, OF BROOKLYN, NEW YORK.

ELECTRICAL DISTRIBUTING SYSTEM.

SPECIFICATION forming part of Letters Patent No. 560,772, dated May 26, 1896.

Application filed February 27, 1896. Serial No. 581,005. (No model.)

*To all whom it may concern:*

Be it known that I, RICHARD R. BOWKER, of the city of Brooklyn, Kings county, and State of New York, have invented a new and useful Improvement in Electrical Distributing Systems, of which the following is a specification.

The invention relates to a system of electrical distribution such as is in use in the electric-lighting plants of cities; and it consists more particularly in the combination, with two generating-stations and an intermediate network of street-conductors, of a tie-feeder extending between said stations and provided with controllable devices whereby the tie-feeder may be caused to deliver the current proceeding from either station or both stations directly to the network of street-conductors.

In the accompanying drawings, Figure 1 is an electrical diagram showing two electric-lighting stations, a network of street-conductors receiving current from both, and a tie-feeder extending between said stations, and also exhibiting a controllable switch-box in said tie-feeder, and means for operating said switch-box from one of said stations. Figs. 2, 3, and 4 represent the general arrangement of a controllable switch-box which I prefer to use in the system represented in Fig. 1.

Similar numerals and letters of reference indicate like parts.

Referring first to Fig. 1, let A and B represent two electric-lighting stations located at a distance one from another. $a\ a'\ a''$, &c., $b\ b'\ b''$ represent street-conductors forming a network to which current is supplied by the stations A and B. The station A supplies the network through feeders, such as $c\ c'\ c''$, communicating with junction-boxes, (indicated by the circles $d\ d'\ d''$,) and the station B supplies the current to the network through the feeders $e\ e'\ e''$, communicating with the junction-boxes $f\ f'\ f''$.

In order to supplement the generating capacity of one station by that of another in case of accident or other cause impairing the efficiency of the first, it is now customary to connect such stations by an independent feeder, (represented in Fig. 1 at C,) which is commonly called the "tie-feeder." Hitherto this tie-feeder has served for no permanent purpose except to connect the two stations in the manner described, and therefore the additional current passing, say, from station A to station B all goes to the network of street-conductors from station B only. There are many reasons, however, why it is advantageous to be able to deliver current to the network of street-conductors directly from the tie-feeder and from either of the two stations which it connects. Such current could evidently be delivered to the street-conductors with a less drop of potential than if it had first to go entirely from one station to another. The tie-feeder would also be given a new utilization in the event of the failure of the generating machinery at one station or the other and would be more effectively connected to afford the necessary supply to the mains. In order to effect this communication between the tie-feeder and the street-conductors, I unite said feeder to the network by suitable permanent branch-conductors P P'. Between the branches and the tie-feeder I interpose suitable switch-boxes D D'. These switch-boxes are to be preferably so arranged that either station may at will interrupt the circuit through the tie-feeder and throw its current, through a branch F or F', directly upon the network of street-conductors. While I may employ for this purpose any form of suitable switch-box, located as set forth and actuated from the station, I prefer to use a special form of controllable switch-box. (Represented sufficiently for purposes of comprehension in the present connection in the drawings, Figs. 2, 3, and 4.) The construction and operation of the said switch-box is fully set forth in the application for Letters Patent of John Van Vleck, simultaneously pending herewith, Serial No. 574,190, and therefore I make no claim to said switch-box and its construction herein.

Referring more particularly to Fig. 4, 1 is the cylindrical casing of the box, within which there is disposed a six-armed spider 2. Passing through a hub in the center of this spider is a shaft which carries a loose plate 3 and also a loose toothed sector 4. The plate 3 carries switch-arms 5 and 6, the said arms entering between spring-contacts 7 and 8, carried, respectively, by metal bars 9 and 10 and 11 and 12, which are supported by the spider and insulated therefrom. The positive conductor $g$ is connected to the plates 9 and 10, and the negative conductor $h$ to the plates 11 and 12. Hence the switch-arm 6, when in contact with the pair of spring-contacts 7, establishes connection between the parts of the positive conductor $g$, and the switch-arm 5, when in contact with the plate 8, establishes connection between the parts of the negative conductor $h$.

13 is a metal clip which is connected to the neutral conductor.

14 is an electric motor of any suitable construction, the field-circuit of which is permanently connected between the positive conductor $g$ and the neutral conductor $m$—that is, between the plate 9 and the clip 13. The armature-circuit of this motor is connected at one end to the switch-arm 6 and at the other end by the wire $i''$ to a switch-arm $j$ at a distant station—say the station A. The switch-arm $j$ may make contact with the point $k$ or $l$, which points connect, respectively, with a neutral and a positive conductor. Between the plate 3 and the pivoted sector 4 extends a spiral spring 15. A train of gearing is interposed between the armature-shaft of the motor 14 and the toothed sector, so that said sector is turned by rotation of the motor.

The operation of the device is as follows, the parts being as shown in Fig. 4: The spring 15 being under tension and acting on the plate 3 draws the switch arms 5 and 6 out of contact with the contact-plates 8 and 7, and thus breaks the circuit in the positive and negative conductors $g$ and $h$. By the same means the switch-arm 6 is brought into contact with the clip 13. Therefore both terminals of the motor-armature are rendered neutral, and the armature which has hitherto rotated the sector 4 from right to left, and so brought the spring 15 into the position shown, stops. If the armature of the motor be afterward actuated so as to turn the toothed sector 4 from left to right, the spring 15 will then pull plate 3 in the opposite direction to that in which it before moved, and thus to bring back the switch-arms 5 and 6 into contact with their contact-plates 7 and 8, thus reëstablishing the circuit in the box. In order to cause the motor thus to reverse its direction, the switch-arm $j$ is moved into contact with the point $l$. This point being positive, while the motor-terminal communicating with the clip 13 is neutral, it follows that the current passes through the motor-armature in an opposite direction to that of the current which hitherto moved it, and the motor turns in the reverse way.

Now, referring to Figs. 2 and 3, Fig. 2 represents a controllable switch-box, intended simply to make and break the circuit in a straight feeder. Fig. 3 shows the arrangement of parts when the switch-box is located at a junction of a feeder and branch.

Referring to Fig. 1, I show at D a controllable switch-box, arranged as shown in Fig. 3; at E a controllable switch-box, arranged as shown in Fig. 2.

In Figs. 2 and 3 I have omitted the motor mechanism for the sake of clearness.

In Figs. 2, 3, and 4 $h'$ is the positive conductor; $g'$, the negative conductor; $m'$, the neutral conductor of the tie-feeder C, while in Fig. 3 $h$ is the branch positive, $g$, the branch negative, and $m$ the branch neutral conductor, these three conductors being united to form the branch F of Fig. 1.

The controllable switch-box D, as will be seen from Fig. 1, is connected to station A by the wire $i$. The controllable switch-box D' is connected to station B by the wire $i'$. The normal condition of these two boxes D and D' will be with the arms 5 and 6 out of contact with the spring contact-plates 7 and 8, and hence the circuit through the branches F F' will be broken, while established through the tie-feeder C. This is the normal condition of affairs. If now either station A or B desires to throw current upon the main network through the tie-feeder, it actuates its switch $j$, thus causing suitable rotation of the motor in either D or D', to bring the parts into the position shown in Fig. 3. Thus, as is evident from Fig. 1, station A, through wire $i$, may control the box D and deliver the current to the main network through the branch F; or station B, through wire $i'$, may control the switch-box D' and deliver current to the main network through the branch F'.

It is sometimes desirable to make it possible to break the tie-feeder between the two stations, so that all of the current from a given station may go to the main network and none of it to the other station. For this purpose I provide in the tie-feeder the box E, the arrangement of this box being as represented at Figs. 2 and 4. The operating-wire $i'''$ of box E goes to station B; or it may go to station A, if desired. The switch at E is normally closed; but in case it is desired to break the circuit through the tie-feeder to enable either station A or B to deliver current directly upon the main network, then the motor is controlled from station B in the manner already described to open the switch at E.

I claim—

1. In an electric distributing system, a supply-station, a controllable switch-box at a distance therefrom, a street-conductor leading from said station to said switch-box, two branch street-conductors also leading from said switch-box, and a means of controlling said switch-box from said station, whereby the supply-current may be directed into either of said branch conductors, substantially as described.

2. In an electric distributing system, a supply-station, a controllable switch-box at a distance therefrom, a street-conductor leading from said station to said switch-box, a branch conductor leading from said switch, a network of street-conductors, a second branch conductor leading from said switch-box to said network, and a means of controlling said switch-box from said station whereby the supply-current may be directed into or out of said network of street-conductors, substantially as described.

3. In an electric distributing system, two supply-stations, a network of street-conductors receiving current from both stations, a tie-feeder between said stations, two branch feeders extending from said tie-feeder to said network, a controllable switch-box interposed in each of said branch feeders and controlling circuits extending respectively from said stations to said switch-boxes, substantially as described.

4. In an electric distributing system, two supply-stations, a network of street-conductors receiving current from both stations, a tie-feeder extending between said stations, two branch feeders extending from said tie-feeder to said network, a controllable switch-box interposed in each of said branch feeders, controlling-circuits extending respectively from said stations to said switch-boxes, a controllable switch-box interposed in said tie-feeder between said before-named switch-boxes, and a controlling-circuit extending from one of said stations to said interposed switch-box, substantially as described.

5. In an electric distributing system, two supply-stations, A and B, a network of street-conductors receiving current from both stations, a tie-feeder C extending between said stations, two branch feeders F, F' extending from said tie-feeder to said network, controllable switch-boxes D, D' interposed at the junction of each of said branch feeders with said tie-feeder, and controlling-circuits $i$ and $i'$ extending from said stations respectively to said switch-boxes D and D', substantially as described.

6. In an electric distributing system two supply-stations A and B, a network of street-conductors receiving current from both stations, a tie-feeder C extending between said stations, two branch feeders F, F' extending from said tie-feeder to said network, controllable switch-boxes D, D' interposed respectively in said feeders F, F' controlling-circuits $i$, $i'$ extending from said stations respectively to said switch-boxes a controllable switch-box E interposed in said tie-feeder between said boxes D, D' and a controlling-circuit $i''$ extending from one of said stations to said box E, substantially as described.

R. R. BOWKER.

Witnesses:
H. R. MOLLER,
I. A. VAN WART.